United States Patent
Kawazura et al.

(10) Patent No.: US 6,927,255 B2
(45) Date of Patent: Aug. 9, 2005

(54) RUBBER COMPOSITION

(75) Inventors: Tetsuji Kawazura, Hiratsuka (JP);
Masayuki Kawazoe, Hiratsuka (JP);
Masao Nakamura, Kawasaki (JP)

(73) Assignees: The Yokohama Rubber Co., Ltd.,
Tokyo (JP); Nippon Zeon Co., Ltd.,
Tokyo (JP)

( * ) Notice: Subject to any disclaimer, the term of this patent is extended or adjusted under 35 U.S.C. 154(b) by 0 days.

(21) Appl. No.: 09/506,443

(22) Filed: Feb. 18, 2000

(65) Prior Publication Data

US 2002/0143106 A1 Oct. 3, 2002

(30) Foreign Application Priority Data

| Feb. 26, 1999 | (JP) | ............................................ 11-050710 |
| Feb. 15, 2000 | (JP) | ....................................... 2000-041396 |

(51) Int. Cl.⁷ .............................................. C08L 53/02
(52) U.S. Cl. .......................................... 525/98; 525/99
(58) Field of Search ............................. 525/98, 99, 314

(56) References Cited

U.S. PATENT DOCUMENTS

| 4,042,555 A | * | 8/1977 | Raimondi et al. ........... 524/505 |
| 4,123,409 A | * | 10/1978 | Kaelble ....................... 523/118 |
| 4,221,681 A | * | 9/1980 | Campbell et al. |
| 4,778,852 A | * | 10/1988 | Futamura ..................... 525/97 |
| 5,422,378 A | * | 6/1995 | Vo .............................. 521/79 |
| 5,658,987 A | * | 8/1997 | Nakamura et al. ............ 525/99 |
| 5,679,744 A | * | 10/1997 | Kawazaura et al. .......... 525/98 |

FOREIGN PATENT DOCUMENTS

| JP | 7-188510 | 7/1995 |
| JP | 8-134267 | 5/1996 |
| JP | 8-193145 | 7/1996 |
| JP | 8-193146 | 7/1996 |
| JP | 8-193147 | 7/1996 |
| JP | 8-283465 | 10/1996 |
| JP | 6-302071 | 11/1996 |
| JP | 10-7844 | 1/1998 |
| JP | 10-36465 | 2/1998 |

OTHER PUBLICATIONS

Baulek et al., "Natural Rubber and Butadiene Rubber Blend Using Diblock Copolymer of Isoprene– Butadiene as Compatibilizer," *Journal of Applied Polymer Science*, vol. 49, pp. 807–814 (1993).

Zanzig et al., "IBR Block Copolymers as Compatibilizers in NR/BR Blends," *Rubber Chemistry and Technology*, vol. 66, pp. 538–549 (1993).

* cited by examiner

*Primary Examiner*—Jeffrey Mullis
(74) *Attorney, Agent, or Firm*—Arent Fox, PLLC

(57) ABSTRACT

A rubber composition comprising (i) an incompatible polymer blend of at least two diene rubbers selected from rubbers containing a conjugated diene and, optionally, an aromatic vinyl monomer and forming two polymer phases (A) and (B), and (ii) 0.1 to 20 parts by weight, based upon 100 parts by weight of the total polymer component including the block copolymer, of a block copolymer having at least two mutually incompatible blocks (a) and (b), wherein the block (a) is compatible with the polymer phase (A) and incompatible with the polymer phase (B) and the block (b) is compatible with the polymer phase (B) and incompatible with the polymer phase (A), and composed of a conjugated diene and, optionally, an aromatic vinyl monomer, and wherein the molecular weights of the polymers forming the polymer phases (A) and (B) satisfy the specified equations (I) and (II) mentioned in the specification.

8 Claims, 2 Drawing Sheets

RUBBER COMPOSITION

BACKGROUND OF THE INVENTION

1. Field of the Invention

The present invention relates to a rubber composition, more specifically relates to a rubber composition suitable for use for a tire tread, sidewalls, or other rubber parts and having improved tensile strength, elongation, and abrasion resistance.

2. Description of the Related Art

In recent years, improvements in various types of performance have been sought in the rubber compositions for automobile and other tires etc. Therefore, in tire tread rubber and the like, several types of polymers have been used by blending together. However, when these polymers are incompatible with each other, phase separated interfaces are present. In most cases, these interfaces become starting points for breakage and are believed to have a detrimental effect on the tensile strength, tear strength, abrasion resistance, etc. However, in tire and other rubber products, since the special process of vulcanization is included, it is not possible to apply as is the molecular design of the block copolymer for control of the phase structure as is normally done in rubber/resin blends or resin/resin blends. Therefore, the problem of the phase separation interface of rubber/rubber blends has not been sufficiently studied and no method for solving this problem had been found yet.

In the past, the decrease in the breaking strength due to the incompatibility of polymer blends obtained by blending block copolymers has not been sufficiently studied. Blending, into a blend of natural rubber (NR)/polybutadiene rubber (BR), a small amount of a block copolymer of polybutadiene (BR) and polyisoprene (IR) has only been described slightly in *J. Apply. Polym. Sci.,* 49 (1993) and *RCT.* 66 (1993). However, the compositions of the block copolymers used in these references have insufficient compatibility with BR, and therefore, are not satisfactory in performance for practical use. Further, attempts have been made to add cis-BR into an incompatible polymer blend of cis-BR/SBR so as to improve the abrasion resistance, but the wet braking performance is decreased, and therefore, there is a limit to the amount of addition of cis-BR and there were consequently problems in practical use. In addition, except for the proposals made by the inventors of the present invention (Japanese Unexamined Patent Publication (Kokai) Nos. 7-188510, 8-134267, 8-193147, 8-193146, 8-193145, 8-283465, 8-302071, 10-007844, and 10-036465), examples of blending a block polymer into a rubber composition as a compatibilizing agent have not been known. The previous proposals by the present inventors did not clarify the relationship between the rubber component forming the matrix of the rubber composition and the molecular weight of the block polymer added. Later study resulted in clarification of this point and the present invention has been completed.

SUMMARY OF THE INVENTION

Accordingly, the object of the present invention is to provide a rubber composition capable of eliminating the above-mentioned problems in the prior art and improving the tensile strength, elongation, abrasion resistance, etc. thereof.

In accordance with the present invention, there is provided a rubber composition comprising (i) an incompatible polymer blend comprising at least two diene rubbers selected from the group consisting of rubbers containing at least one conjugated diene monomer and optionally at least one aromatic vinyl monomer, such as natural rubber (NR), polyisoprene rubber (IR), polybutadiene rubber (BR), styrene-butadiene copolymer rubber (SBR), styrene-isoprene copolymer rubber (SIR) and styrene-isoprene-butadiene rubber (SIBR) and forming two incompatible polymer phases (A) and (B) and (ii) 0.1 to 20 parts by weight, based upon 100 parts by weight of the total polymer component including the block copolymer, of a block copolymer having at least two mutually incompatible blocks (a) and (b), the block (a) being compatible with the polymer phase (A) and being incompatible with the polymer phase (B) and the block (b) being compatible with the polymer phase (B) and incompatible with the polymer phase (A), and comprising at least one conjugated diene monomer (e.g., isoprene, butadiene) and, optionally, at least one aromatic vinyl monomer (e.g., styrene), wherein the molecular weights of the polymers forming the polymer phases (A) and (B) satisfy the following equations (I) and (II):

$$S_A = Mw_{30}(A)/Mw(a) \leq 1.2 \quad \text{(I)}$$

$$S_B = Mw_{30}(B)/Mw(b) \leq 1.2 \quad \text{(II)}$$

wherein $Mw_{30}(A)$: molecular weight of the low molecular weight portion of the polymer forming the polymer phase (A), $Mw_{30}(B)$: molecular weight of the low molecular weight portion of the polymer forming the polymer phase (B), $Mw(a)$: weight average molecular weight of block (a) of block copolymer, and $Mw(b)$: weight average molecular weight of block (b), of block copolymer.

In accordance with the present invention, there is also provided a rubber composition, wherein 5 to 200 parts by weight, based upon 100 parts by weight of the block copolymer, of a polymer (α) compatible with the block (a) and the polymer phase (A) and/or a polymer (β) compatible with the block (b) and polymer phase (B) are further blended and the weight average molecular weights of the polymers (α) and (β) satisfy the following equations (III) and (IV):

$$S_\alpha = Mw(\alpha)/Mw(a) \leq 1.2 \quad \text{(III)}$$

$$S_\beta = Mw(\beta)/Mw(b) \leq 1.2 \quad \text{(IV)}$$

wherein $Mw(\alpha)$: weight average molecular weight of polymer (α), $Mw(\beta)$: weight average molecular weight of polymer (β), $Mw(a)$: weight average molecular weight of block (a) of block copolymer, and $Mw(b)$: weight average molecular weight of block (b) of block copolymer.

In accordance with the present invention, there is further provided a rubber composition comprised of a block copolymer having at least two mutually incompatible blocks (a) and (b) and comprising at least one conjugated diene and, optionally, at least one aromatic vinyl monomer based upon 100 parts by weight of the same, 5 to 200 parts by weight of a polymer (α) compatible with the block (a) and/or a polymer (β) compatible with the block (b), the weight average molecular weights of the polymers (α) and (β) satisfying the following equations (III) and (IV):

$$S_a = Mw(\alpha)/Mw(a) \leq 1.2 \quad \text{(III)}$$

$$S_\beta = Mw(\beta)/Mw(b) \leq 1.2 \quad \text{(IV)}$$

wherein $Mw(\alpha)$: weight average molecular weight of polymer (α),

Mw(β): weight average molecular weight of polymer (β),

Mw(a): weight average molecular weight of block (a) of block copolymer, and

Mw(b): weight average molecular weight of block (b) of block copolymer.

BRIEF DESCRIPTION OF THE DRAWINGS

The present invention will be better understood from the description set forth below with reference to the accompanying drawings, wherein.

GPC Measurement Conditions
  GPC: HLC-8020 made by Toso
  Column: GMH-HR-H, 2
  Temperature: 40° C.
  Mobile phase: THF
  Standard substance: 10 points used between standard polystyrene 1000 to 10,000,000
  Approximation method: By tertiary method.
  Preparation of polymer sample: 50 mg of the polymer was dissolved in 10 cc of THF. The mixture was stirred at room temperature for about 168 hours so as to dissolve. This was then filtered by a 0.5 micron filter (H25-5 made by Toso) to remove the insolubles. The result was used as, the sample. The amount injected into the GPC was made 400 μl.

Figure 1:
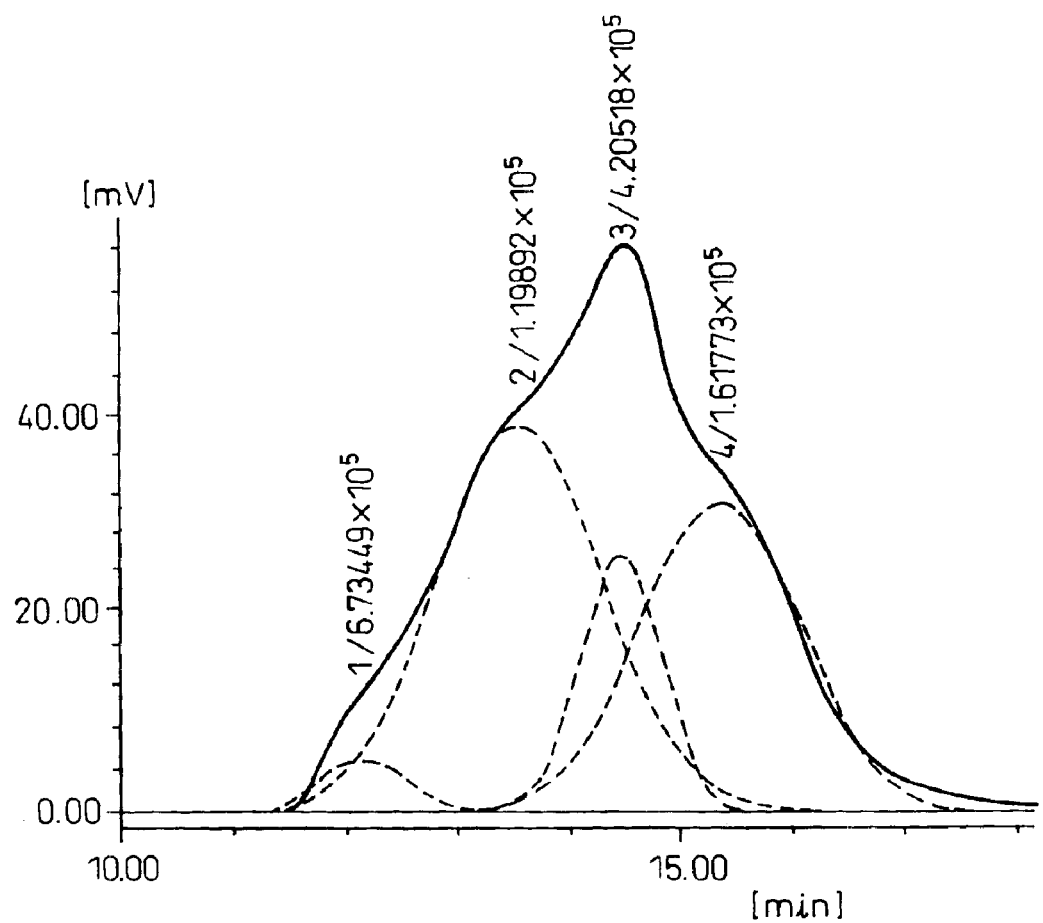
FIG. 1 is a view of an example of a molecular weight distribution curve (integrated molecular weight curve) of molecular weights measured by GPC forming the basis for finding the molecular weights of the low molecular weight portions of the polymers of the polymer phases (A) and (B) of equations (I) and (II)
Figure 2:
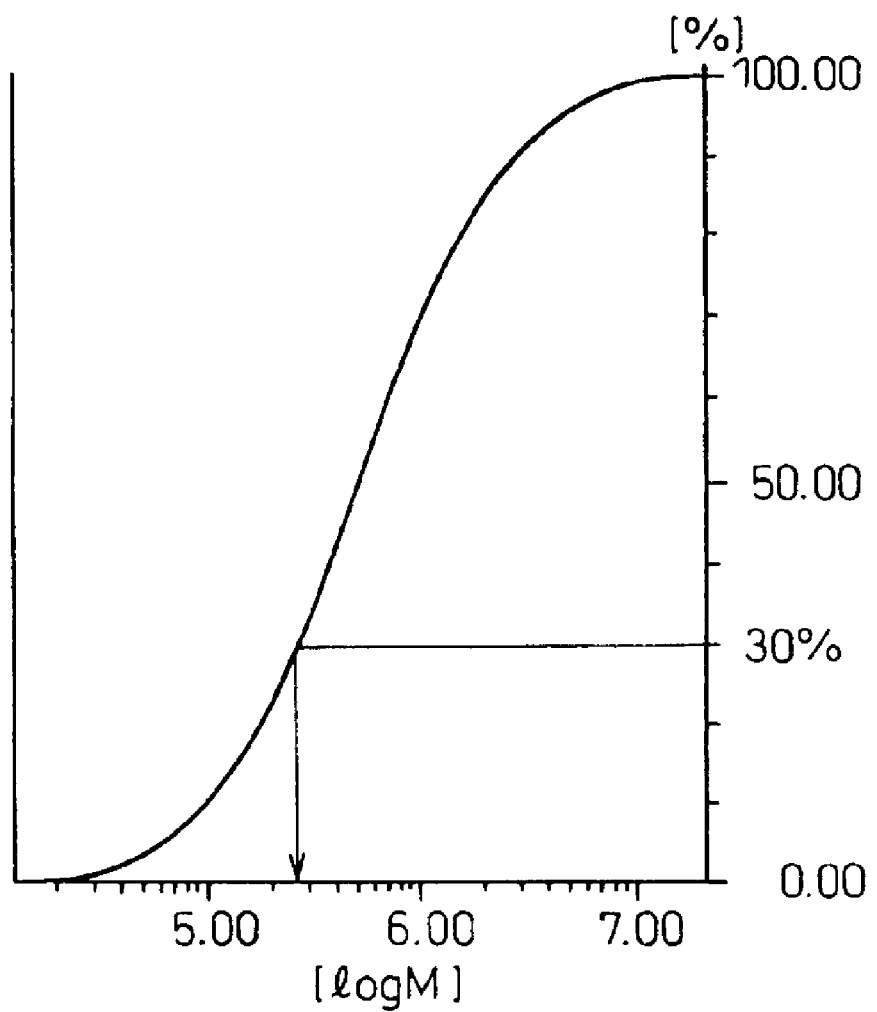

FIG. 2 is a view of an integrated molecular weight curve obtained by converting the molecular weight distribution curve of FIG. 1, wherein $Mw_{30}(A)$ and $Mw_{30}(B)$ of equations (I) and (II) are found from the molecular weight of the cumulative area 30% as shown in FIG. 2.

DESCRIPTION OF THE PREFERRED EMBODIMENTS

The present inventors found that the above-mentioned object can be achieved by compounding, into a rubber composition formed from at least two rubber phases comprising at least two incompatible rubbers, a block polymer comprising at least two incompatible blocks having molecular weights which are defined by two types of relationships with the molecular weights of the rubbers forming the two rubber phases.

The tire rubber composition according to the present invention can be obtained by blending (i) an incompatible polymer blend of two polymer phases (A) and (B) comprising at least two types of incompatible rubbers of NR, IR, BR, SBR, SIR, and SIBR, preferably in the weight ratio of (A)/(B) of 90/10 to 10/90, more preferably 85/15 to 15/85) and (ii) 0.1 to 20 parts by weight, preferably 1 to 15 parts by weight, based upon 100 parts by weight of the entire rubber component including a block copolymer, of the block copolymer having at least two blocks comprising monomers selected from isoprene, butadiene, and styrene, wherein the blocks (a) and (b) are mutually incompatible, the block (a) is compatible with the polymer phase (A) and incompatible with the polymer phase (B), and the block (b) is compatible with the polymer phase (B) and incompatible with the polymer phase (A), preferably the weight ratio of (a)/(b) of 80/20 to 20/80, more preferably 60/40 to 40/60, and wherein the molecular weights of the polymers forming the polymer phases (A) and (B) satisfy the equations (I) and (II). Note that $S_A$ and $S_B$ preferably are 0.1 to 1.2, more preferably 0.3 to 1.0.

If the value of $S_A$ and the value of $S_B$ are more than 1.2, the block copolymer added while mixing the rubber component does not disperse well and the effect as a compatibilizing agent cannot be sufficiently exhibited.

Note that the molecular weights of the low molecular weight portions of the polymers forming the polymer phases (A) and (B) mean those found as values of molecular weights (i.e., $Mw_{30}(A)$ and $Mw_{30}(B)$) corresponding to 30% of the cumulative area when converting the curve of the distribution of the molecular weight measured by GPC such as shown in FIG. 1 to the integrated molecular weight curve, as shown in FIG. 2. The GPC is measured by, for example, dissolving the polymer sample into THF, removing the insoluble gel component by a 0.5 micron filter, then calculating the molecular weight by an equation obtained from the amount of elution of standard polystyrene.

Further, it is possible to previously blend a block copolymer having at least two mutually incompatible blocks (a) and (b) and comprising a conjugated diene and/or aromatic vinyl monomer with a polymer (α) compatible with the block (a) and the polymer phase (A) and/or a polymer (β) compatible with the block (b) and the polymer phase (B), which satisfies the following equations (III) and (IV):

$$S_\alpha = Mw(\alpha)/Mw(a) \leq 1.2 \tag{III}$$

$$S_\beta = Mw(\beta)/Mw(b) \leq 1.2 \tag{IV}$$

wherein Mw(α): weight average molecular weight of polymer (α),

Mw(β): weight average molecular weight of polymer (β),

Mw(a): weight average molecular weight of block (a) of block copolymer, and

Mw(b): weight average molecular weight of block (b) of block copolymer, so as to improve the dispersion of the block copolymer during mixing of the rubber and obtain the better mechanical strength.

Note that $S_\alpha$ and $S_\beta$ are preferably 0.1 to 1.2, more preferably 0.3 to 1.0.

In particular, (α) should be added when the low molecular weight portion of the polymer forming the polymer phase (A) is small and (β) should be added when the low molecular weight portion of the polymer forming the polymer phase (B) is small. Therefore, even when the above equations (I) and/or (II) are not satisfied, it is possible to obtain the effect of the present invention by blending in the polymer (α) or (β).

Here, as the polymer (α) or (β), rubbers such as IR, BR, SBR, SIBR having a suitable molecular weight are preferable, but it is not limited to a rubber so long as the object of improving the dispersion at the time of mixing the block polymer is achieved without impairing the vulcanized physical properties of the rubber composition finally obtained. Other polymers may also be used.

The amount of the polymer (α) or (β) blended should be 5 to 200 parts by weight, preferably 20 to 100 parts by weight, based upon 100 parts by weight of the block copolymer. If the amount is less than 5 parts by weight, the anticipated effect is not manifested, while if more than 200 parts by weight, the elasticity or mechanical strength is decreased, and therefore, there is a detrimental effect on the physical properties or the Mooney viscosity of the starting rubber is decreased and handling becomes difficult.

The process of production of the block copolymer used in the present invention is not particularly limited, but, for example, this may be produced by polymerizing isoprene, butadiene, or styrene monomers in a hydrocarbon solvent using an organoactive metal as an initiator. As the organoactive metal, for example, an anionic polymerizable organoactive metal such as an organoalkali metal compound, organoalkali earth metal compound, or organolanthanoid based rare earth metal compound may be mentioned. Among these, an organoalkali metal compound is particularly preferable.

According to the present invention, it is possible to further blend low molecular weight polymers (for example, IR, BR, SBR, or SIBR) as parts of the polymers forming the polymer phases so as to satisfy the above equations (I) and (II). The amounts of the low molecular weight polymers blended are preferably 1 to 50 parts by weight, based upon 100 parts by weight of the rubber component, as a whole. If the amounts blended are too great, this leads to the decrease in the tensile strength etc., and therefore, this is not preferred.

The incompatible polymer blend comprising the polymer phases (A) and (B) used in the present invention is not particularly limited so long as two or more types of polymers selected from polymers containing conjugated dienes and/or aromatic vinyl monomers such as NR, IR, BR, SBR, are selected and constitute two incompatible polymer phases (A) and (B). Further, the block copolymer comprising the blocks (a) and (b) used in the present invention may be made any polymer provided with the above conditions. For example, a BR block, SBR block, IR block, SIR (i.e., styrene isoprene rubber) block, BIR (i.e., butadiene isoprene) block, SBIR (i.e., styrene butadiene isoprene) block, etc. may be suitably combined for use.

Representative examples of combinations of such incompatible polymers and block copolymers are as follows:

TABLE I

| Matrix polymer (A)/(B) | Block copolymer ((a)/(b)) |
| --- | --- |
| NR/SBR (wherein, amount of vinyl of Bd part is not more than about 60 mol %) | IR/SBR (amount of vinyl of Bd part not more than about 60 mol %) or SBR/SBR (amount of St about 20% by weight, amount of vinyl of Bd part about 70 mol %) |
| NR/BR (cis content not less than 90 mol %) | IR/SBR (amount of St about 20% by weight, amount of vinyl of Bd part about 50 mol %) |

Of course, the present invention is not limited to the above examples.

The rubber composition according to the present invention may suitably use various conventional additives according to its application, for example, various reinforcing fillers generally used in the prior art such as carbon black and silica, softeners, antioxidant, wax resin, vulcanization agent, vulcanization accelerator, vulcanization accelerator activator, etc. Further, blowing agent, low moisture plasticizer, short fibers, etc. may be used.

In blending the rubber composition according to the present invention, it is preferable to first mix the rubber (i.e., matrix rubber and block copolymer) and the additives other than, for example, vulcanization agent and vulcanization accelerator according to an ordinary method, then blend them. Of course, even if some of these ingredients are separately mixed, the resultant mixture, needless to say, falls in the technical scope of the present invention so long as the object of the present invention is not impaired. Further, the blending may be carried out in any means used in the past.

The rubber composition of the present invention may be vulcanized by a general method. The amount of the above additives blended may be the general amounts. Further, the vulcanization conditions may be made the general conditions.

EXAMPLES

The present invention will be further illustrated with reference to Examples, but the present invention is of course by no means limited in scope by these Examples.

Standard Examples 1 to 6, Examples 1 to 12, and Comparative Examples 1 to 7

The ingredients of the formulations of Tables II to IV, Table V, and Table VI (parts by weight) (wherein the characteristics of the polymers used as the phase (A) and phase (B) are shown in Table VII, the characteristics of the block polymers are shown in Table VIII, and the characteristics of the polymers ($\alpha$) and ($\beta$) are shown in Table IX) were mixed in 1.5 liter Bambury mixers for 4 minutes, then the vulcanization accelerators and sulfur were mixed with the mixtures by 8-inch test-use roll mill to obtain the rubber compositions. These rubber compositions were press vulcanized at 160° C. for 20 minutes to prepare the desired test pieces which were then subjected to various tests and measured in physical properties. The physical properties of the vulcanates obtained were as shown in Tables II, III and IV.

Mixing Method

The mixing methods used in the Examples and the Comparative Examples were all according to the following mixing specifications:

1) Rotor speed: 60 rpm
2) Temperature adjustment: 50° C.
3) Charging specifications:
0' . . . rubber ingredients (matrix rubber, block copolymer)
1' . . . carbon black in half amount, zinc white, stearic acid
2'30" . . . carbon black in half amount, antioxidant, wax
3'30" . . . raising and lowering of ram (cleaning ram portion)
4'00" . . . discharge The "yes" in the compatibility section of Tables II, III and IV indicates a compatible relationship, while the "no" indicates an incompatible relationship.

TABLE II

|  | Standard Ex. 1 | Comp. Ex. 1 | Comp. Ex. 2 | Ex. 1 |
| --- | --- | --- | --- | --- |
| phase (A) polymer NR-2 | 50 | 45 | 45 | 45 |
| phase (B) polymer SBR | 50 | 45 | 45 | 45 |
| Block polymer BP-1 | — | 10 | — | — |
| BP-2 | — | — | 10 | — |
| BP-3 | — | — | — | 10 |
| Compatibility |  |  |  |  |
| Block (a) ↔ block (b) | — | No | No | No |
| Block (a) ↔ phase (A) polymer | — | Yes | Yes | Yes |
| Block (a) ↔ phase (B) polymer | — | No | No | No |
| Block (b) ↔ phase (A) polymer | — | No | No | No |
| Block (b) ↔ phase (B) polymer | — | Yes | Yes | Yes |
| Relation with molecular weight |  |  |  |  |
| $S_A = Mw_{30}$ (A)/Mw (a) | — | 1.8 | 1.7 | 0.8 |
| $S_B = Mw_{30}$ (B)/Mw (b) | — | 1.2 | 0.6 | 0.6 |
| Physical properties of rubber composition |  |  |  |  |
| Tensile strength (MPa) | 23.2 | 23.5 | 24.0 | 26.3 |
| Elongation (%) | 370 | 378 | 380 | 418 |
| Abrasion resistance index (index) | 100 | 102 | 101 | 120 |

TABLE III

| | Standard Ex. 2 | Standard Ex. 3 | Standard Ex. 4 |
|---|---|---|---|
| phase (A) polymer NR-1 | 80 | — | — |
| NR-2 | — | 80 | — |
| NR-3 | — | — | 80 |
| phase (B) polymer BR | 20 | 20 | 20 |
| Physical properties of rubber composition | | | |
| Tensile strength (MPa) | 29.9 | 28.1 | 26.6 |
| Elongation (%) | 568 | 578 | 579 |
| Abrasion resistance index (index) | 100 | 100 | 100 |
| Times to breakage in fatigue test | 2195900 | 2320300 | 2342100 |

| | Comp. Ex. 3 | Comp. Ex. 4 | Ex. 2 |
|---|---|---|---|
| phase (A) polymer NR-2 | 78 | 78 | 78 |
| phase (B) polymer BR | 19 | 19 | 19 |
| Block polymer BP-4 | 3 | — | — |
| BP-5 | — | 3 | — |
| BP-6 | — | — | 3 |
| Compatibility | | | |
| Block (a) ↔ block (b) | No | No | No |
| Block (a) ↔ phase (A) polymer | Yes | Yes | Yes |
| Block (a) ↔ phase (B) polymer | No | No | No |
| Block (b) ↔ phase (A) polymer | No | No | No |
| Block (b) ↔ phase (B) polymer | Yes | Yes | Yes |
| Relation with molecular weight | | | |
| $S_A = Mw_{30}(A)/Mw(a)$ | 1.7 | 1.7 | 0.9 |
| $S_B = Mw_{30}(B)/Mw(b)$ | 0.7 | 0.3 | 0.3 |
| Physical properties of rubber composition | | | |
| Tensile strength (MPa) | 28.4 | 28.3 | 30.6 |
| Elongation (%) | 581 | 580 | 586 |
| Abrasion resistance index (index) | 101 | 102 | 106 |
| Times to breakage in fatigue test | 2310000 | 2298700 | 3212400 |

| | Comp. Ex. 5 | Ex. 3 |
|---|---|---|
| phase (A) polymer NR-1 | 78 | — |
| NR-3 | — | 78 |
| phase (B) polymer BR | 19 | 19 |
| Block polymer BP-5 | — | 3 |
| BP-6 | 3 | — |
| Compatibility | | |
| Block (a) ↔ block (b) | No | No |
| Block (a) ↔ phase (A) polymer | Yes | Yes |
| Block (a) ↔ phase (B) polymer | No | No |
| Block (b) ↔ phase (A) polymer | No | No |
| Block (b) ↔ phase (B) polymer | Yes | Yes |
| Relation with molecular weight | | |
| $S_A = Mw_{30}(A)/Mw(a)$ | 1.3 | 1.2 |
| $S_B = Mw_{30}(B)/Mw(b)$ | 0.3 | 0.3 |
| Physical properties of rubber composition | | |
| Tensile strength (MPa) | 29.9 | 29.1 |
| Elongation (%) | 572 | 599 |
| Abrasion resistance index (index) | 102 | 107 |
| Times to breakage in fatigue test | 2188800 | 3400200 |

TABLE IV

| | Standard Ex. 5 | Comp. Ex. 6 | Ex. 4 | Ex. 5 |
|---|---|---|---|---|
| phase (A) polymer NR-1 | 60 | 58 | 55 | 57.85 |
| NR-2 | — | — | — | — |
| phase (B) polymer BR | 40 | 39 | 39 | 39 |
| Block polymer BP-7 | — | 3 | 3 | 3 |
| Polymer (α) α-1 | — | — | 3 | — |
| α-2 | — | — | — | 0.15 |
| α-3 | — | — | — | — |
| α-4 | — | — | — | — |
| Polymer (β) β-1 | — | — | — | — |
| Compatibility | | | | |
| Block (a) ↔ block (b) | — | No | No | No |
| Block (a) ↔ phase (A) polymer | — | Yes | Yes | Yes |
| Block (a) ↔ phase (B) polymer | — | No | No | No |
| Block (b) ↔ phase (A) polymer | — | No | No | No |
| Block (b) ↔ phase (B) polymer | — | Yes | Yes | Yes |
| Polymer (α) ↔ block (a) | — | — | Yes | Yes |
| Polymer (α) ↔ phase (A) polymer | — | — | Yes | Yes |
| Polymer (β) ↔ block (b) | — | — | — | — |
| Polymer (β) ↔ phase (B) polymer | — | — | — | — |
| Relation with molecular weight | | | | |
| $S_A = Mw_{30}(A)/Mw(a)$ | — | 2.2 | 2.2 | 2.2 |
| $S_B = Mw_{30}(B)/Mw(b)$ | — | 0.3 | 0.3 | 0.3 |
| $S_α = Mw(α)/Mw(a)$ | — | — | 0.7 | 1 |
| $S_β = Mw(β)/Mw(b)$ | — | — | — | — |
| Rate of polymers (α) and (β) added/wt % (to block polymer) | — | — | 100 | 5 |
| Physical properties of rubber composition | | | | |
| Tensile strength (MPa) | 27.9 | 28.3 | 29.2 | 28.7 |
| Elongation (%) | 550 | 560 | 588 | 575 |
| Abrasion resistance index (index) | 100 | 102 | 110 | 103 |

| | Ex. 6 | Ex. 7 | Ex. 8 | Comp. Ex. 7 |
|---|---|---|---|---|
| phase (A) polymer NR-1 | 55 | 52 | 55 | 55 |
| NR-2 | — | — | — | — |
| phase (B) polymer BR | 39 | 39 | 39 | 39 |
| Block polymer BP-7 | 3 | 3 | 3 | 3 |
| Polymer (α) α-1 | — | — | — | — |
| α-2 | 3 | 6 | — | — |
| α-3 | — | — | 3 | — |
| α-4 | — | — | — | 3 |
| Polymer (β) β-1 | — | — | — | — |
| Compatibility | | | | |
| Block (a) ↔ block (b) | No | No | NO | No |
| Block (a) ↔ phase (A) polymer | Yes | Yes | Yes | Yes |
| Block (a) ↔ phase (B) polymer | No | No | No | No |
| Block (b) ↔ phase (A) polymer | No | No | No | No |
| Block (b) ↔ phase (B) polymer | Yes | Yes | Yes | Yes |
| Polymer (α) ↔ block (a) | Yes | Yes | Yes | Yes |
| Polymer (α) ↔ phase (A) polymer | Yes | Yes | Yes | Yes |
| Polymer (β) ↔ block (b) | — | — | — | — |
| Polymer (β) ↔ phase (B) polymer | — | — | — | — |

TABLE IV-continued

| | | | | |
|---|---|---|---|---|
| Relation with molecular weight | | | | |
| $S_A = M_{w30}(A)/M_w(a)$ | 2.2 | 2.2 | 2.2 | 2.2 |
| $S_B = M_{w30}(B)/M_w(b)$ | 0.3 | 0.3 | 0.3 | 0.3 |
| $S_\alpha = M_w(\alpha)/M_w(a)$ | 1 | 1 | 1.2 | 1.4 |
| $S_\beta = M_w(\beta)/M_w(b)$ | | | | |
| Rate of polymers ($\alpha$) and ($\beta$) added/wt % (to block polymer) | 100 | 200 | 100 | 100 |
| Physical properties of rubber composition | | | | |
| Tensile strength (MPa) | 29.7 | 28.5 | 28.8 | 28.4 |
| Elongation (%) | 585 | 588 | 577 | 562 |
| Abrasion resistance index (index) | 108 | 103 | 105 | 102 |

| | Ex. 9 | Ex. 10 | Standard Ex. 6 | Ex. 11 | Ex. 12 |
|---|---|---|---|---|---|
| phase (A) polymer NR-1 | 58 | 56 | — | — | — |
| NR-2 | — | — | 60 | 58 | 57.4 |
| phase (B) polymer BR | 38 | 38 | 40 | 39 | 39 |
| Block polymer BP-6 | — | — | — | 3 | 3 |
| Block polymer BP-7 | 3 | 3 | — | — | — |
| Polymer ($\alpha$) $\alpha$-1 | — | — | — | — | — |
| $\alpha$-2 | — | 2 | — | — | 0.6 |
| $\alpha$-3 | — | — | — | — | — |
| $\alpha$-4 | — | — | — | — | — |
| Polymer ($\beta$) $\beta$-1 | 1 | 1 | — | — | — |
| Compatibility | | | | | |
| Block (a) ↔ block (b) | No | No | — | No | No |
| Block (a) ↔ phase (A) polymer | Yes | Yes | — | Yes | Yes |
| Block (a) ↔ phase (B) polymer | No | No | — | No | No |
| Block (b) ↔ phase (A) polymer | No | No | — | No | No |
| Block (b) ↔ phase (B) polymer | Yes | Yes | — | Yes | Yes |
| Polymer ($\alpha$) ↔ block (a) | — | Yes | — | — | Yes |
| Polymer ($\alpha$) ↔ phase (A) polymer | — | Yes | — | — | Yes |
| Polymer ($\beta$) ↔ block (b) | Yes | Yes | — | — | — |
| Polymer ($\beta$) ↔ phase (B) polymer | Yes | Yes | — | — | — |
| Relation with molecular weight | | | | | |
| $S_A = M_{w30}(A)/M_w(a)$ | 2.2 | 2.2 | — | 0.9 | 0.9 |
| $S_B = M_{w30}(B)/M_w(b)$ | 0.3 | 0.3 | — | 0.3 | 0.3 |
| $S_\alpha = M_w(\alpha)/M_w(a)$ | — | 1.0 | — | — | 0.6 |
| $S_\beta = M_w(\beta)/M_w(b)$ | 0.3 | 0.3 | — | — | — |
| Rate of polymers ($\alpha$) and ($\beta$) added/wt % (to block polymer) | 33 | 100 | — | — | 20 |
| Physical properties of rubber composition | | | | | |
| Tensile strength (MPa) | 28.4 | 30 | 26.8 | 27.7 | 29.8 |
| Elongation (%) | 570 | 590 | 520 | 566 | 602 |
| Abrasion resistance index (index) | 103 | 107 | 100 | 101 | 111 |

TABLE V

NR/SBR Blend Formulation (Parts by Weight)

| | |
|---|---|
| Rubber component | 100 |
| Carbon black (N339)*1 | 50 |
| Zinc white | 3 |
| Stearic acid | 2 |
| Antioxidant (6C)*2 | 3 |
| Wax | 2 |
| Vulcanization accelerator (NS)*3 | 1 |
| Sulfur | 1.7 |

*1: Seast KH, made by Tokai Carbon Co.
*2: Santoflex 13, made by Flexis Co.
*3: Santocure NS, made by Flexis Co.

TABLE VI

NR/BR Blend Formulation (Parts by Weight)

| | |
|---|---|
| Rubber component | 100 |
| Carbon black (N110)*1 | 50 |
| Zinc white | 5 |
| Stearic acid | 2 |
| Antioxidant (6C)*2 | 3 |
| Vulcanization accelerator (NS)*3 | 1.2 |
| Sulfur | 1 |

*1: Diablack I (made by Mitsubishi Chemical)
*2: Santoflex 13 (made by Flexis Co.)
*3: Santocure NS (made by Flexis Co.)

TABLE VII

Characteristics of Polymers Used as Phase (A) and Phase (B)

| | Overall (MW) | 30% (Mw) |
|---|---|---|
| NR-1*1 | $7.57 \times 10^5$ | $3.9 \times 10^5$ |
| NR-2*2 | $1.19 \times 10^6$ | $2.6 \times 10^5$ |
| NR-3*3 | $4.65 \times 10^5$ | $1.8 \times 10^5$ |
| SBR*4 | $3.72 \times 10^5$ | $1.9 \times 10^5$ |
| BR*5 | $3.51 \times 10^5$ | $1.1 \times 10^5$ |

(Note)
*1: Masticated natural rubber RSS#3. Masticated by 8-inch roll mill at 80° C. for 3 minutes.
*2: Natural rubber SMR-L
*3: Masticated natural rubber RSS#3. Masticated by 8-inch roll mill at 8° C. for 15 minutes.
*4: NS 114 (SBR made by Nippon Zeon)
*5: BR 1220 (BR made by Nippon Zeon)

TABLE VIII

Characteristics of Block Polymer

| | Block (a) | | Block (b) | |
|---|---|---|---|---|
| | Microstructure | Mw | Microstructure | Mw |
| BP-1 | Polyisoprene (cis/trans/vn = 77/16/7) | $1.48 \times 10^5$ | SBR (St = 48 wt %, Vn = 11 mol %) | $1.61 \times 10^5$ |
| BP-2 | Polyisoprene (cis/trans/vn = 77/16/7) | $1.52 \times 10^5$ | SBR (St = 18 wt %, Vn = 11 mol %) | $3.12 \times 10^5$ |
| BP-3 | Polyisoprene (cis/trans/vn = 77/16/7) | $3.10 \times 10^5$ | SBR (St = 18 wt %, Vn = 11 mol %) | $3.21 \times 10^5$ |
| BP-4 | Polyisoprene (cis/trans/vn = 77/16/7) | $1.51 \times 10^5$ | SBR (St = 19 wt %, Vn = 46 mol %) | $1.47 \times 10^5$ |
| BP-5 | Polyisoprene (cis/trans/vn = 77/16/7) | $1.49 \times 10^5$ | SBR (St = 19 wt %, Vn = 46 mol %) | $3.22 \times 10^5$ |
| BP-6 | Polyisoprene (cis/trans/vn = 77/16/7) | $3.01 \times 10^5$ | SBR (St = 19 wt %, Vn = 46 mol %) | $3.21 \times 10^5$ |
| BP-7 | Polyisoprene (cis/trans/vn = 77/16/7) | $1.80 \times 10^5$ | SBR (St = 19 wt %, Vn = 46 mol %) | $3.22 \times 10^5$ |

(Note) BP-1 to BP-7 were obtained by 2-stage polymerization by butyl lithium initiator in n-hexane solvent.

TABLE IX

Characteristics of Polymers Used as (α) and (β)

| | Microstructure | Mw |
|---|---|---|
| α-1 | Polyisoprene (cis/trans/vn = 77/16/7) | $1.2 \times 10^5$ |
| α-2 | Polyisoprene (cis/trans/vn = 77/16/7) | $1.8 \times 10^5$ |
| α-3 | Polyisoprene (cis/trans/vn = 77/16/7) | $2.2 \times 10^5$ |
| α-4 | Polyisoprene (cis/trans/vn = 77/16/7) | $2.5 \times 10^5$ |
| β-1 | SBR (St = 19 wt %, Vn = 46 mol %) | $1.0 \times 10^5$ |

(Notes) α-1 to α-4 amd β-1 were obtained by polymerization in organic solvents using organometallic compounds as initiators.

The physical properties evaluated in the above Examples were measured by the following methods:

Tensile strength (Mpa): Measured according to JIS K6251.

Elongation (%): Measured according to JIS K6251.

Abrasion resistance test: Measured using a Lambourn abrasion tester at conditions of a slip rate of 25% and a load of 5 kg. The results are shown indexed to the formulation of the corresponding Standard Example as 100 (abrasion resistance index). The larger the figure, the better the abrasion resistance shown.

Times to breakage in fatigue test: Shown by number of times to breakage of a JIS No. 3 dumbbell shaped sample after being given repeated deformation at a cycle rate of 400 rpm at an elongation stress of 100% (average for four tests).

The incompatibility of polymers was judged by the following method:

1) The incompatibility of the polymer phases (A) and (B) of the polymer blend was judged by vulcanizing the polymer blend, preparing ultrathin slice samples by the freezing method, then dyeing these in a gas phase with a benzene solution of osmium tetraoxide at room temperature for about 15 hours. The presence of phase (a) separated structure was examined by observation through a transmission type electron microscope at magnifications of about 5000 to 10,000.

2) The incompatibility of the blocks (a) and (b) of the block copolymer was judged by preparing samples in the same way as above from the block copolymer in the unvulcanized state, then observing them through a transmission type electron microscope at a magnification of about 60,000 to examine the presence of a phase separated structure.

3) The incompatibility of the blocks of the block copolymer and the polymer phases of the polymer blend was judged by separating polymerizing and preparing the polymers corresponding to the polymers constituting the blocks, mixing these with the matrix polymers, vulcanizing them, then proceeding in the same way as above to prepare samples for observation through an electron microscope and observing these at magnifications of about 5000 to 10,000 to examine the presence of phase separated structures.

In addition, the compatibilities and incompatibilities may be decided by judging the presence of bimodal or not from the temperature dependence curve of tan δ or by judging the presence of plurality of glass transition temperatures or not of the blend polymers can be observed by DSC measurement and further may be judged by an optical microscope if the phase separated structure reaches as much as several dozen microns. Among these, the above direct observation by an electron microscope is the most sensitive method.

As explained above and as shown in Examples 1 to 12, the rubber compositions according to the present invention are improved in mechanical strength such as tensile strength, elongation, abrasion resistance, and fatigue resistance compared with the rubber compositions of Comparative Examples 1 to 7.

What is claimed is:

1. A rubber composition comprising (i) an incompatible polymer blend comprising at least two diene-based rubbers selected from the group consisting of rubbers containing at least one conjugated diene monomer and, optionally, at least one aromatic vinyl monomer and forming two polymer phases (A) and (B) and (ii) 0.1 to 20 parts by weight, based upon 100 parts by weight of the total polymer component including a block copolymer, of the block copolymer having at least two mutually incompatible blocks (a) and (b), in which the block (a) is compatible with the polymer phase (A) and incompatible with the polymer phase (B) and the block (b) is compatible with the polymer phase (B) and incompatible with the polymer phase (A), and comprising at least one conjugated diene monomer and, optionally, at least one aromatic vinyl monomer and (iii) 5 to 200 parts by weight, based upon 100 parts by weight of the block copolymer, of a polymer (α) compatible with the block (a) and the polymer phase (A), a polymer (β) compatible with the block (b) and polymer phase (B) and a mixture of the polymer (α) and the polymer (β), wherein the weight average molecular weights of the polymers (α) and (β) satisfy the following equations (III) and (IV):

$$Mw(\alpha)/Mw(a) \leq 1.2 \tag{III}$$

$$Mw(\beta)/Mw(b) \leq 1.2 \tag{IV}$$

wherein Mw(α): weight average molecular weight of polymer (α),

Mw(β) weight average molecular weight of polymer (β),

Mw(a): weight average molecular weight of block (a) of block copolymer, and

Mw(b): weight average molecular weight of block (b) of block copolymer.

2. A rubber composition as claimed in claim 1, wherein said diene rubbers are NR, IR, BR, SBR, SIR and SIBR.

3. A rubber composition as claimed in claim 1, wherein a weight ratio of polymer phase (A)/polymer phase (B) is 90/10 to 10/90.

4. A rubber composition as claimed in claim 1, wherein said block copolymer contains at least two blocks selected from the group consisting of BR block, SBR block, IR block, SIR block, BIR block and SBIR block.

5. A rubber composition as claimed in claim 1, wherein a weight ratio of block (a)/block (b) is 80/20 to 20/80.

6. A rubber composition as claimed in claim 1, wherein said polymers (α) and (β) are selected from IR, BR, SBR and SIBR.

7. A rubber composition consisting essentially of (I) 100 parts by weight of a block copolymer having at least two mutually incompatible blocks (a) and (b) and composed of at least one conjugated diene monomer and, optionally, at least one aromatic vinyl monomer and (II) 5 to 200 parts by weight of (i) a polymer (α) compatible with the block (a), (ii) a polymer (β) compatible with the block (b) or (iii) a mixture of the polymer (α) and the polymer (β), wherein said polymers (α) and (β) are selected from IR, BR, SBR and SIBR, and wherein the weight average molecular weights of the polymers (β) and (β) satisfy the following equations (III) and (IV):

$$0.3 \leq Mw(\alpha)/Mw(a) \leq 1.0 \tag{III}$$

$$0.3 \leq Mw(\beta)/Mw(b) \leq 1.0 \tag{IV}$$

wherein Mw(α): weight average molecular weight of polymer (α),

Mw(β): weight average molecular weight of polymer (β),

Mw(a): weight average molecular weight of block (a) of block copolymer, and

Mw(b): weight average molecular weight of block (b) of block copolymer, wherein said block copolymer contains at least two blocks (a) and (b) selected from the group consisting of BR block, SBR block, IR block, SIR block, BIR block and SBIR block.

8. A rubber composition as claimed in claim 7, wherein a weight ratio of block (a)/block (b) is 80/20 to 20/80.

* * * * *